Dec. 28, 1965  J. FROMKIN  3,226,627
TWO STATE DEVICES CONTROLLED BY AN INPUT AND
PHASE-SHIFTED SIGNAL APPLIED TO
A TRIGGER MEANS OF SAID DEVICES
Filed April 24, 1961  2 Sheets-Sheet 1

INVENTOR.
JACK FROMKIN
BY
Flam and Flam
ATTORNEYS.

Dec. 28, 1965  J. FROMKIN  3,226,627
TWO STATE DEVICES CONTROLLED BY AN INPUT AND
PHASE-SHIFTED SIGNAL APPLIED TO
Filed April 24, 1961  A TRIGGER MEANS OF SAID DEVICES 2 Sheets-Sheet 2

INVENTOR.
JACK FROMKIN
BY
Flam and Flam
ATTORNEYS.

United States Patent Office 3,226,627
Patented Dec. 28, 1965

3,226,627
TWO STATE DEVICES CONTROLLED BY AN INPUT AND PHASE-SHIFTED SIGNAL APPLIED TO A TRIGGER MEANS OF SAID DEVICES
Jack Fromkin, Gardena, Calif., assignor to Epsilon Industrial Electronics, a limited purpose partnership, Los Angeles, Calif.
Filed Apr. 24, 1961, Ser. No. 104,976
11 Claims. (Cl. 323—22)

This invention relates to a regulator for delivering energy at a constant level despite variations in the energy level of the source. Although the regulator is usable with various energy sources, a typical example is the supply of electrical energy at a fixed voltage from an unregulated source of electrical energy.

There are basically two causes for deviation in energy level in a regulated power supply. One of the factors is non-uniformities of the regulator itself operating at different energy levels and caused either by variation in the input or the output. In a typical voltage regulator, this simply means that the regulator itself offers impedance which naturally introduces a voltage drop that depends upon the load. The second factor stems from variations in the input which tend to produce variations in the output, even with no change in characteristic operation of the regulator itself. If the internal impedance of the regulator is negligible as compared to the impedance of the load during all conditions of operation, then the only significant cause for variation in output voltage is variation in input voltage.

An object of this invention is to provide a new power supply, utilizing a switching device such as a silicon controlled rectifier (SCR) that offers negligible impedance to the passage of power between the source and the load during conductive conditions.

In the usual power supply, a departure in output voltage from a desired standard is sensed as an error and applied to control a variable device for corrective purposes. In order to obtain the requisite regulation, sensitivity often must be increased by the use of amplifiers and the like. Regulation is, in the last analysis, a function of system gain and sensitivity of the element which controls the ultimate output.

Another object of the present invention is to provide an entirely new regulator that does not depend upon an error being sensed and hence, does not depend upon amplifiers, sensitivity, or the like, but merely upon a relationship between constants in the system.

It is well understood that in a full-wave system utilizing a switching device such as the thyratron or an SCR, the average voltage output $V$ can be related to the angle $\alpha$ between 0° and 180° of the A.C. source at which conduction is first permitted. Thus:

(1) $\qquad V = E/\pi(1 + \cos \alpha)$ where $E$ is the peak value of the sinusoidal input voltage, the instantaneous value of which is $E \sin 2\pi ft$, where $t$ is time and $f$ is frequency. If the output voltage $V$ is to remain constant, it is obvious from an inspection of the above equation that the product $E$ and $(1+ \cos \alpha)$ must be constant. The object, therefore, is to adjust the firing angle $\alpha$ as the input voltage $E$ varies, in order to provide a compensating relationship therebetween.

I provide a unijunction (UJT) or other device having the characteristics of a UJT for the purpose of sending a triggering gate current to an SCR that serves as the switching device. It is well understood that a UJT fires at a potential that is a constant fraction $\eta$ of interbase voltage $Ebb$. Utilizing this principle, I apply an interbase voltage to the UJT corresponding to a constant $K_1$ multiplied by the peak value $E$ of the input voltage. Across the emitter and the first base of the UJT, I apply, first of all, a constant voltage $K_2$ and a voltage that is phase retarded relative to the input voltage, $-K_3E \cos 2\pi ft$. The emitter voltage is then $(K_2 - K_3E \cos 2\pi ft.)$. This emitter voltage is adequate to trigger the UJT when it is equal to $\eta K_1E$, which is the interbase voltage multiplied by the intrinsic stand-off ratio $\eta$. Accordingly firing occurs when (2) $\qquad K_2 - K_3E \cos 2\pi ft. = \eta K_1E$ or when $\qquad \cos 2\pi ft. = K_2/K_3E - \eta K_1/K_3$ Thus the firing angle is $\cos^{-1}(K_2/K_3E - \eta K_1/K^3)$. Substituting this equation, or this value of $\alpha$ in Equation 1 it can be seen that the output voltage $V$ may be related to the constants of the system, and the peak input voltage $E$.

(3) $\qquad V = E/\pi(1 + K_2/K_3E - \eta K_1/K_3)$

If the output voltage is to remain constant despite variations in peak input $E$ then, by application of elementary principles of differential calculus, it can be shown that such criteria is met providing (4) $\qquad K_3 = \eta K_1$ Thus, the following differential equation can be derived from Equation 3

(5) $\qquad dv = 1/\pi(1 - \eta K_1/K_3) de$

This differential equation simply states that for a given change in peak input voltage $E$, the output voltage will change accordingly and in the proportion $$1/\pi(1 - \eta K_1/K_3)$$

Of course, the change can be zero if the proportional constant $1/\pi(1 - \eta K_1/K_3)$ is likewise zero. Thus, the criterion for regulation is (4) $\qquad K_3 = \eta K_1$ The output voltage can then be related to the constants of the system by substitution of the preceding relationship into Equation 3. Thus:

(6) $\qquad V = K_2/\pi K_3 V = K_2/\pi \eta K_1$

Another object of this invention is to provide a network capable of providing a hyperbolic function, that is, one in which the product of two variables remains constant.

Another object of this invention is to provide unique circuit arrangements for carrying out the above objects.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
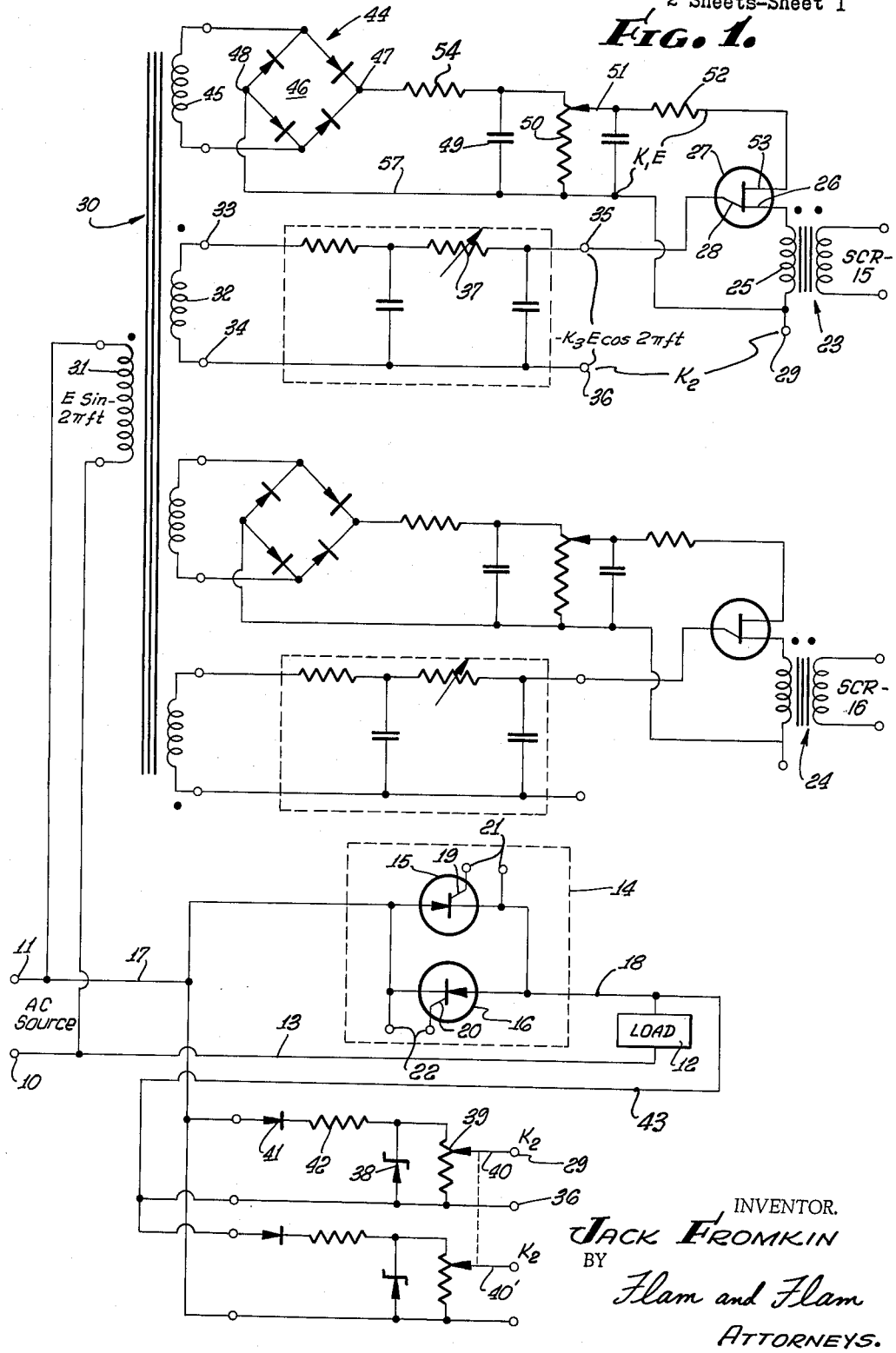
FIGURE 1 is a wiring diagram illustrating an embodiment of the present invention.

In FIG. 1 the regulator is shown as having terminals 10 and 11 cooperable with the source of alternating current. A load 12 is adapted to be energized from the A.C. source. For this purpose, one side of the load 12 connects directly to the terminal 10 by a lead 13. The other side of the load connects to the terminal 11 via a switching device 14 that controls the period of on-time to off-time in such manner as to maintain the average voltage V across the load 12 constant and in accordance with the equation (1) $\quad V = E/\pi(1 + \cos \alpha)$ where E is the peak value of the A.C. input voltage at source terminals 10 and 11, the instantaneous value of which is given as $E \sin 2\pi$ ft., and $\alpha$ is the firing angle (see FIG. 3).

In the present example, the switching device 14 comprises a pair of silicon controlled rectifiers (SCRs) 15 and 16. The SCRs 15 and 16 are connected in inverse parallel for full-wave operation. Thus, the anode of the rectifier 15 and the cathode of the rectifier 16 are connected to each other and via a lead 17 to the source terminal 11. Correspondingly, the cathode of the rectifier 15 and the anode of the rectifier 16 are connected to each other and via a lead 18 and load 12 to the source terminal 10.

The SCRs have gates 19 and 20 for application of triggering current thereto. Indicated in association with the SCR 15 are input terminals 21 for application of voltage between its cathode and gate. Corresponding terminals 22 are provided for the SCR 16. Control voltages for terminals 21 and 22 are derived from pulse transformers 23 and 24. Once during every cycle of the source wave, triggering pulses are sent to each SCR for rendering them conductive. The SCRs 15 and 16 operate symmetrically (FIG. 3) that is, the SCR 15 operates for the positive half-cycle in precisely the same manner that the SCR 16 operates for the negative half-cycle. A description of the circuits for one of the SCRs therefore suffices as a description of the other.

The transformer 23 which triggers the SCR 15 has a primary winding 25. One terminal of the primary winding 25 is connected to the first base 26 of a unijunction 27. A current pulse can pass through the transformer winding only via the base 26 and the emitter 28 of the unijunction 27. Voltage is applied across the other terminal 29 of the transformer primary winding 25 and the emitter 28. This voltage is a composite form, represented by the function $K_2 - K_3 E \cos 2\pi$ ft. In order to build this voltage, a phase shift network is provided. A transformer 30 has a primary winding 31 connected across the source terminals 10 and 11, and has a plurality of secondary windings. One of the secondary windings 32 is connected to the input terminals 33 and 34 of a phase shift network. The characteristics of the phase shift network and the turns ratio between the windings 31 and 32 and the polarity of the secondary 32 are such that a voltage at the output terminals 35 and 36 of the phase shift network corresponds to $-K_3 E \cos 2\pi$ ft. which is one part of the voltage function to be applied to the unijunction.

A phase shift network adequate for present purposes comprises two stages of 45° phase shift, each produced by a parallel capacitor and a series resistor. The resistor 37 of one of the sections is adjustable in order to ensure a precise overall 90° phase shift. In this example, the turns ratio is $2K_3$ since this particular network attenuates by a factor of 2. One terminal 35 of the network connects directly to the emitter 28.

A constant voltage $K_2$ is applied between the terminal 29 of the transformer primary 25 and the terminal 36 of the phase shift network in order to add in the second part of the desired voltage function $K_2 - K_3 E \cos 2\pi$ ft.

For deriving this voltage $K_2$, a Zener diode 38 is provided. Zener diode 38 is characterized by constant reverse breakdown voltage. In order to derive from this constant breakdown voltage, a lesser constant voltage $K_2$, the Zener diode 38 is shunted by a potentiometer resistor 39 which cooperates with a slider 40. The slider is connected to the primary winding terminal 29, as indicated by the reference character 29 at the slider. One end of the resistor 39 is connected to phase shift network terminal 36 indicated by the reference character 36 at the resistor 39.

The Zener diode 38 could be excited from one-half wave of the source at the terminals 10 and 11. However, for purposes to appear hereinafter, the circuit for the Zener diode parallels the SCR 15. The circuit during operation of the Zener diode 38 can be traced as follows: lead 17 from source terminal 11, a rectifying diode 41, current limiting resistor 42, Zener diode 38 and potentiometer resistor 39 in parallel, lead 43, load 12 and source terminal 10.

Figure 3:
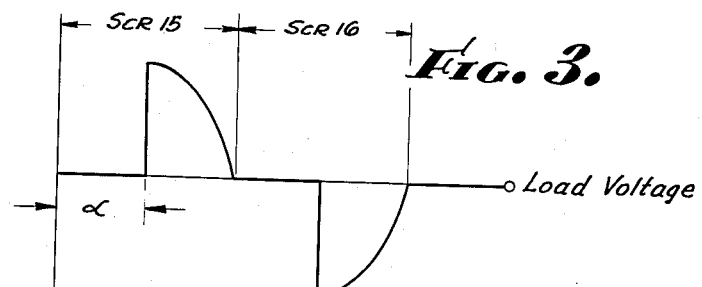
FIG. 3 is a composite graph illustrating time plots of voltages at several points in the circuit of FIG. 1.
Figure 3:
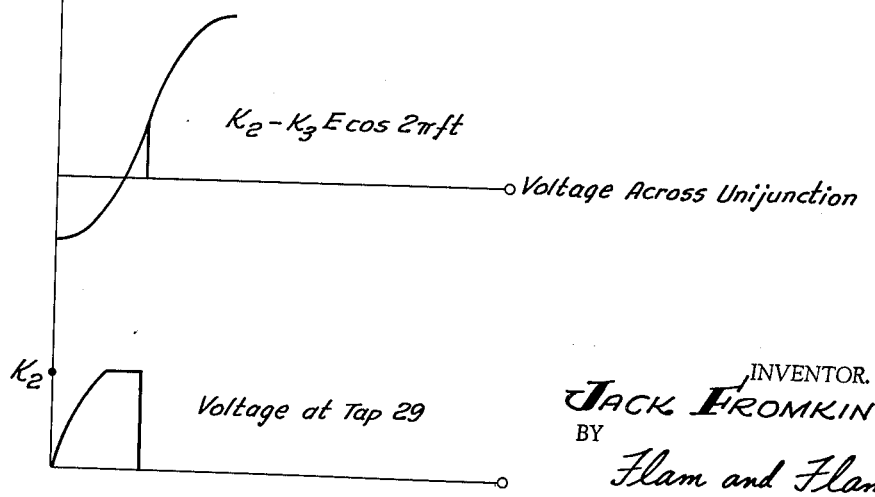

When the SCR 15 has not yet fired, the voltage of the source is applied across the Zener diode network and the voltage $K_2$ is derived, which of course determines the firing of unijunction 27. As soon as the SCR 15 fires, the voltage across the Zener network collapses since the SCR shunts it. This means that the voltage to the unijunction emitter 28 is now determined by $-K_3 E \cos 2\pi$ ft. alone. The unijunction is thus immediately extinguished and is furthermore precluded from firing for the remainder of the half cycle since only a positive voltage greater than $K_3 E \cos 2\pi$ ft. can fire it. As soon as the SCR 15 is extinguished at the end of the half cycle, the voltage begins to approach $K_2$ and the unijunction 27 may be fired on the next cycle. The unijunction 27 accordingly conducts only momentarily, and the wave form is preserved as shown in FIG. 3. Only a narrow notch at instant of firing modifies an otherwise perfect cosine wave.

In order to apply an interbase voltage $K_1 E$ to the unijunction 27, a small power supply 44 is provided. The power supply 44 is driven by a secondary winding 45 of the transformer 30. It has a full wave rectifier bridge structure 46, by way of example, from which a direct current output is derived from quadrature load terminals 47 and 48. A filtering capacitor 49 and a potentiometer resistor 50 are each connected across load terminals 47 and 48 through a surge limiting resistor 54. Cooperable with the potentiometer resistor 50 is a slider 51 that connects, via a conventional temperature stabilizing resistor 52, to the second base 53 of the unijunction 27. One end of the potentiometer resistor 50 connects, via a lead 57, to the transformer terminal 29 which operates as a reference ground in the system. An interbase voltage $K_1 E$ is applied to the unijunction 27, the constant $K_1$ being calibrated through the action of the slider 51.

The other half of the system for SCR 16 is identical to that just described, the circuit being appropriately polarized for operation during the negative half cycle of the input at terminals 10 and 11.

In order to adjust the output or average voltage of the system as it is applied to the load 12, the constant $K_2$ is adjusted by shifting the slider 40 and the corresponding slider 40' in the other half of the circuit. Adjustment of $K_2$, of course, does not affect the crucial equation for regulation which is (4) $\quad K_3 = \eta K_1$ The sliders 40 and 40' are ganged for simultaneous operation.

Figure 2:
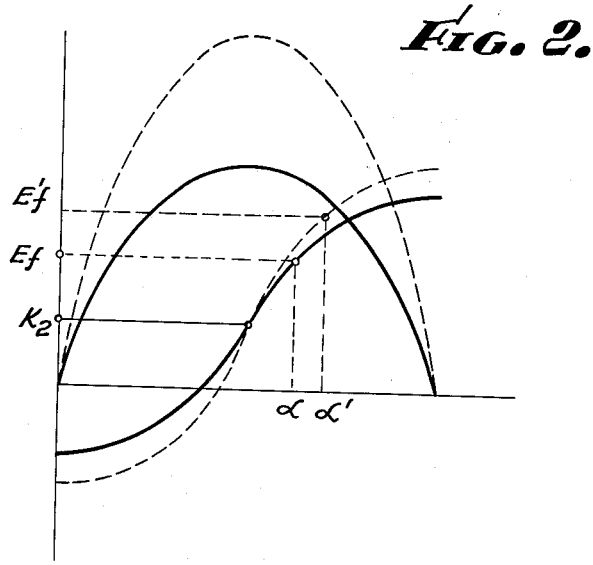
FIG. 2 is a diagram illustrating the nature of the interaction of circuit constants to preserve constant average output voltage.

The manner in which the differential regulator operates may be appreciated by reference to FIG. 2, in which a half cycle of the alternating current source $E \sin 2\pi$ ft. is illustrated along with the expression $K_2 - K_3 E \cos 2\pi$ ft. In dot and dash lines there is illustrated a situation in which the source voltage increases to $E' \sin 2\pi$ ft. The object, of course, is to keep the average voltage constant by making constant the expression $E/\pi(1 + \cos \alpha)$ constant. During the conditions shown in full lines, unijunction 27 fires at an angle $\alpha$.

As the source voltage increases to the dot and dash line condition, the firing voltage of the unijunction increases from $E_f$ to $E'_f$ due to elevation of interbase voltage and the equation $E_f = \eta E_{bb}$. The result is increase in firing angle to $\alpha'$. The SCRs need conduct for only a shorter portion of the cycle with a larger input voltage to achieve the same average voltage at the load. Adjustment of the constants relative to each other ensures this result.

There are, of course, limits to the range of operation of the system. For example, it is only possible to attain a voltage corresponding to the average value of the input (less the insignificant drop of the SCR). While increasing source voltage may be fully compensated by moving the firing angle $\alpha$ toward 180°, opposite compensation is not always possible. Thus, when the conduction angle is 0, it can proceed no further. The ability to regulate, therefore, for given swings of input voltage depends, therefore, upon how close the operating voltage is to the average value of the source voltage. Thus if E decreases by 10%, then $\alpha$ in the expression $(1+ \cos \alpha)$ must be capable of change so that expression $(1+ \cos \alpha)$ increases by 10%. This may not be true if the regulator is already set to operate at a value where $\alpha$ must be normally near 0. This simply means that range of regulated operation increases as output voltage is reduced.

Although a full-wave operation is described, a half-wave system utilizing but one switching device is fully operable. The voltage range, however, will be halved.

The inventor claims:

1. In a differential regulator cooperable with a cyclic voltage source having a variable peak amplitude: a two state device having a high impedance off state and a low impedance on state; trigger means for controlling the phase angle at which the device changes its state; said trigger means having two variables that must reach a characteristic proportionate relationship to each other in order to trigger; first means deriving from said source a first signal voltage proportional to the peak amplitude of said source; second means deriving from said source a second signal proportional to the instantaneous amplitude of said source but in fixed spaced phase relationship to said source; means applying said signals as said variables to said trigger means so that the operating angle of said trigger means is correlated to the peak amplitude of said source to maintain constant the average amplitude passed by said two state device.

2. In a differential regulator cooperable with a cyclic voltage source having a variable peak amplitude; a two state device having a high impedance off state and a low impedance on state; said device returning to its off state in the absence of predetermined forward bias; a trip device having a bias circuit, an input circuit, and an output circuit, the output circuit being tripped when an input signal reaches a certain value dependent upon the bias circuit; circuit means for operating said two state device from said output circuit; means operated by said source biasing said trip device directly in proportion to the peak amplitude of said source; and means applying an input signal to said trip device directly in proportion to the instantaneous amplitude of said source but in fixed spaced phase relationship to said source so that the operating angle of said two state device is correlated to the peak amplitude of said source to maintain constant the avearge amplitude passed by said two state device.

3. In a differential regulator cooperable with a cyclic energy source having a variable peak amplitude: a controlled rectifier having a gate, a cathode and an anode; a unijunction transistor having two bases and an emitter; means applying an interbase voltage to said unijunction corresponding to a first constant multiplied by the peak amplitude of said source; means applying between the emitter and one base, a voltage corresponding to a second constant less a third constant multiplied by the instantaneous amplitude of said energy source 90° phase retarded; and means for firing said controlled rectifier upon triggering of said unijunction.

4. The combination as set forth in claim 3 in which said third constant is related to said first constant by the intrinsic standoff ratio of said unijunction to maintain constant the voltage at a load switched by said controlled rectifier.

5. The combination as set forth in claim 3 together with means for adjusting said second constant, and in which said third constant is related to said first constant by the intrinsic standoff ratio of said unijunction to maintain constant the voltage at a load switched by said controlled rectifier.

6. The combination as set forth in claim 3 together with means for removing from said unijunction the voltage component corresponding to said second constant during firing of said controlled rectifier.

7. In a differential regulator cooperable with an alternating current source having a variable peak amplitude: a two state device having a high impedance off state and a low impedance on state; said device returning to its off state in the absence of a predetermined forward bias; said device having means operated by a current pulse for switching the device to its on state; a unijunction transistor having two bases and an emitter; transformer means excited by said source and having a first and second secondary windings; a rectifier network deriving from said first secondary winding a voltage corresponding to a first constant $K_1$ multiplied by the peak value E of said source; means for applying said voltage $K_1 E$ across the bases of said unijunction; means for deriving from said source a voltage corresponding to a second constant $K_2$; a phase shift network deriving from said second secondary winding a voltage corresponding to a constant $K_3 E \cos 2\pi$ ft. where the source voltage is represented by $E \sin 2\pi$ ft.; circuit means applying across the emitter and one base of the unijunction the difference between said voltage $K_2$ and said voltage $K_3 E \cos 2\pi$ ft. to produce a current pulse when said difference voltage is adequate; and means for applying the current pulse of said unijunction to said switching means of said two state device; the constant $K_3$ being related to the first constant $K_1$ by the intrinsic standoff ratio of said unijunction to maintain constant the average voltage of a load switched by said service.

8. The combination as set forth in claim 7 together with adjustable circuit means for adjusting $K_2$ to change the operating point of said regulator.

9. The combination as set forth in claim 7 in which said means for deriving the voltage $K_2$ comprises a network paralleling said two state device whereby the constant voltage $K_2$ is reduced when the two state device is switched to its on state.

10. In a differential regulator for deriving a hyperbolic function and cooperable with a cyclic energy source: a two state device having a high impedance off state and a low impedance on state; trigger means for changing the state of said device; said trigger means having two variables that must reach a characteristic relation to each other in order to trigger; first means deriving from said source a first signal voltage proportional to the peak amplitude of said source; second means deriving from said source a second signal proportional to the instantaneous amplitude of said source but in fixed spaced phase relationship to said source; means applying said signals as said variables to said trigger means so that the operating angle $\alpha$ of said trigger means is correlated to the peak amplitude E of said source in accordance with the equation $E(1+ \cos \alpha) =$ a constant.

11. In a differential regulator cooperable with a sinusoidally varying source having a peak amplitude subject to variations: a switching device cooperable with said source operable to produce an average voltage output corresponding to a constant multiplied by $$E(1+ \cos \alpha)$$

where E is a value of the peak amplitude of the source and $\alpha$ is the firing angle related to the source cycle; trigger means for firing said switching device; and means for producing a critical voltage for operating said trigger means, said critical voltage comprising a constant voltage, a D.C. voltage proportional to E, and a voltage proportional to E subject to cyclic variations in fixed phase relationship to said source, the constants of proportionality having a designed ratio whereby the value of $$E \cos(1+\alpha)$$

remains constant.

References Cited by the Examiner

UNITED STATES PATENTS

| 2,998,547 | 8/1961 | Berman | 323—22 |
| 3,010,062 | 11/1961 | Van Emden | 323—22 |
| 3,020,448 | 6/1962 | Fefer | 315—138 |
| 3,103,618 | 9/1963 | Slater | 307—88.5 |
| 3,113,198 | 12/1963 | Shinn | 219—499 |
| 3,116,446 | 12/1963 | Healey | 323—22 X |
| 3,158,799 | 11/1964 | Kelley, et al. | 307—88.5 |

LLOYD McCOLLUM, *Primary Examiner.*

MILTON O. HIRSHFIELD, *Examiner.*